Oct. 29, 1935.    J. E. OWEN    2,018,737

SEISMIC SURVEYING

Filed July 21, 1933

INVENTOR
John E. Owen
BY Kenyon & Kenyon
ATTORNEYS

Patented Oct. 29, 1935

2,018,737

UNITED STATES PATENT OFFICE 2,018,737

SEISMIC SURVEYING

John E. Owen, Bloomfield, N. J., assignor to Geophysical Research Corporation, New York, N. Y., a corporation of New Jersey Application July 21, 1933, Serial No. 681,404

4 Claims. (Cl. 181—0.5)

This invention relates to seismic surveying.

According to one method of seismic surveying, a charge of explosive is detonated at a point in the earth's surface and at a distant point the artificial seismic waves produced by the explosion are received and recorded. The records thus obtained are then interpreted in terms of the subterranean formations between the source of the seismic waves and the recording position. It is often found that local disturbances interfere with proper recording of the seismic impulses from which information as to the depth and location of the underground formation is obtained.

An object of this invention is to increase the amplitude of the record obtained from a given weight of explosive and also to lessen the effect of local disturbances.

According to this invention, a plurality of relatively small charges of explosive are successively detonated in the immediate vicinity of each other in the earth's sub-surface and, at a distant point on the earth's surface, independent records are made of the waves thus produced, which records are subsequently algebraically combined to produce a composite record. The successive charges may be all set at a single point but usually are set at closely adjacent points since such arrangement makes possible setting all the charges in the earth in advance and detonating them without unnecessary delay between explosions. In the composite record, the effects of the local disturbances will be largely canceled out as such disturbances are at random and are not periodic or uniform. Furthermore, the amplitude of the composite record will materially exceed the amplitude of the record which would be obtained from detonation of a single charge of explosive equal in weight to the combined weight of the explosive in a plurality of charges. By use of this method, it is possible to reduce the amount of explosive required to obtain the desired records. This is a decided advantage in localities where there are structures such as bridges or buildings which might be damaged by a large shock but which will not be affected by small tremors. The increased amplitude of a composite record obtained according to this invention results from the fact that the amplitude of a seismic wave is a function of the energy in the charge of explosive. Generally speaking, the amplitude of the seismic wave is proportional to the square root of the energy. Therefore, if a given weight of explosive is divided into nine equal charges, the amplitude obtained from the explosion of one such charge will be one-third the amplitude of the record which will be obtained by exploding the total charge. However, nine such records combined will yield a composite record, the amplitude of which is three times that of the record obtained by a single explosion of the total weight of explosive.

Furthermore, experiments indicate that small charges are in some cases more efficient as producers of seismic waves than larger ones hence the factor of gain may, in many cases, be even greater than above indicated.

Other objects, novel features and advantages of this invention will be apparent from the following specification and accompanying drawing, wherein.

Figure 1:
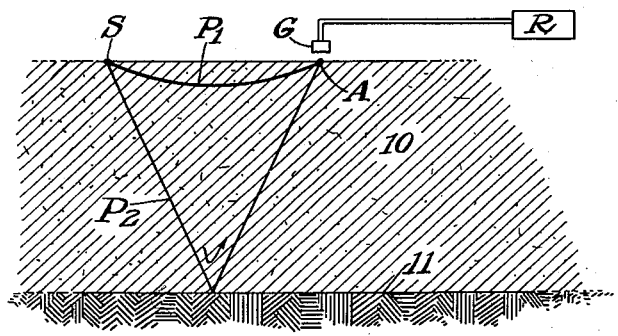
Fig. 1 represents a vertical section through the earth's crust, illustrating the arrangement of the wave source and recorder.

In Fig. 1, 10 represents loose unconsolidated material forming a part of the earth's crust and 11 represents a sub-surface formation of rock or other dense material. S indicates the location of a charge of explosive and R represents a seismograph recorder having a geophone G or other suitable wave detector located at point A in the earth's crust. The geophone or detector is connected in the usual manner to the recorder R which produces a graph on a moving strip of paper in the well-known manner. Detonation of the explosive at S sets up seismic waves in the material 10. Certain of these waves pass through the earth near its surface from the point S directly to the point A and the path of these waves is represented by the line $P_1$. Other waves will travel downwardly through the material 10 and be reflected from the sub-surface formation 11 up to the point A and the full line $P_2$ indicates the path of these waves. Means such as illustrated in United States patent to J. C. Karcher, No. 1,706,066 or other suitable means are provided for energizing the recorder at the instant of detonation to produce an indication on the record of the time of such detonation.

Figure 2:
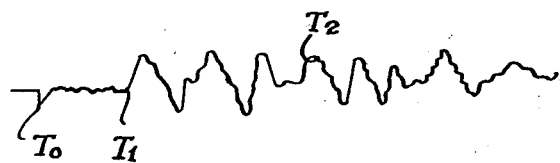
Fig. 2 is a record resulting from a standard charge explosion.

In the graph shown in Fig. 2, $T_0$ represents the time of detonation of the explosive at the point S while $T_1$ designates the time of arrival at the point A of direct waves passing along the path $P_1$ and $T_2$ represents time of arrival of the first crest of a reflected wave traveling along the path $P_2$. The deflections or ripples between the points $T_0$ and $T_1$ and the ripples appearing along the rest of the graph at irregular intervals are results of local random disturbances.

Figure 3:
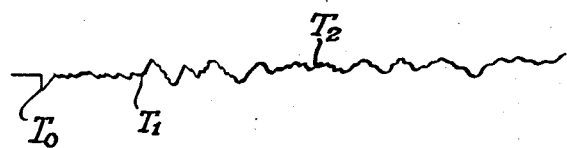
Fig. 3 is a record obtained from a fractional charge explosion.

According to this invention, a plurality of small charges of explosive are successively detonated at or closely adjacent to the point S and a separate record is made by the recorder R of the waves produced by each charge, the records of the direct and reflected waves being substantially identical in character. Fig. 3 illustrates a record resulting from one of said small charges. Here again, $T_0$ represents the time of detonation, while $T_1$ designates the time of arrival at the point A of direct waves passing along the path $P_1$ and $T_2$ represents the time of arrival of the first crest of a reflected wave traveling along the path $P_2$. The deflections or ripples between the points $T_0$ and $T_1$ and the ripples appearing intermittently along the remainder of the record are the results of local random disturbances. Preferably, substantially equal charges of explosive are used to produce the records which are subsequently combined to yield a composite record as with equal charges the maximum amplitude of the resulting record for a given amount of explosive is obtained.

Figure 4:
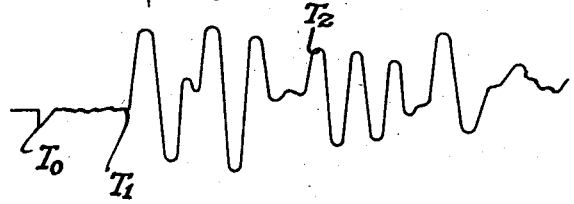
Fig. 4 is a composite record made from several records such as shown in Fig. 3.

The record shown in Fig. 4 is obtained by algebraically combining the several records resulting from the detonation of the plurality of small charges of explosive. To obtain the composite record shown in Fig. 4, the amplitude of each individual record corresponding to a given instant of time may be measured and such values added algebraically, the sum thus obtained being taken as the amplitude of the composite record at said given instant. The composite record may be made by manually recording with drafting instruments the algebraic sum of the instantaneous amplitudes or it may be produced by combining the indivdual records into a single curve by means of an integrating machine as described in the patent to Taylor, No. 1,799,398. As the local disturbances are random, the probability is that there will be little, if any, conformity between the deflections or ripples in the records resulting from such disturbances. Therefore, in the composite record, the deflections or ripples due to local disturbances largely cancel each other so that the composite record between the points $T_0$ and $T_1$ is of slight, if any irregularity and the remainder of the record is a substantially smooth curve. The deflections resulting from the direct waves and reflected waves are additive and, therefore, the amplitude of the resulting record is much greater than the amplitude of any one of the individual records. Also, the amplitude of the composite record will be greater than that of the record which would have been obtained by setting off an equal amount of explosive in a single charge.

The composite record obtained according to the invention, is more easily interpreted inasmuch as deflections due to local disturbances are substantially eliminated and either a record of given amplitude may be obtained from a smaller total of explosive or of greater amplitude from a given weight of explosive than could be obtained by setting off the explosive in a single charge.

In the specification and claims, it is to be understood that seismic is used as descriptive of waves produced by the detonation of explosive near the earth's surface and transmitted through the earth and that in the claims the phrase "in the immediate vicinity of each other" includes both arranging the successive charges at the same point and arranging such charges at closely adjacent points. Also, it is to be understood that the invention herein disclosed is not limited to the specific disclosure herein but is limited only by the scope of the appended claims.

I claim:
1. The method of seismic surveying which comprises successively producing artificial seismic waves at points in the immediate vicinity of each other in the earth's surface, successively receiving the waves thus produced at a common distant point in the earth's surface, independently recording the received waves and subsequently combining a plurality of individual records thus obtained into a composite record by algebraically adding the corresponding instantaneous amplitudes of said individual records.

2. The method of seismic surveying according to claim 1, wherein the artificial seismic waves are produced with equal amplitude.

3. The method of seismic surveying which comprises detonating in succession a plurality of charges of explosive in the immediate vicinity of each other in the earth's surface, successively receiving the waves thus produced at a common distant point in the earth's surface, individually recording the received waves and subsequently combining a plurality of individual records thus obtained into a composite record by algebraically adding the corresponding instantaneous amplitudes of said individual records.

4. The method of seismic surveying according to claim 3, wherein the charges of explosive are equal.

JOHN E. OWEN.